June 5, 1928. 1,672,492
A. R. HUMPHREY
CLAMP FOR BRAKE LINING
Filed July 7, 1927
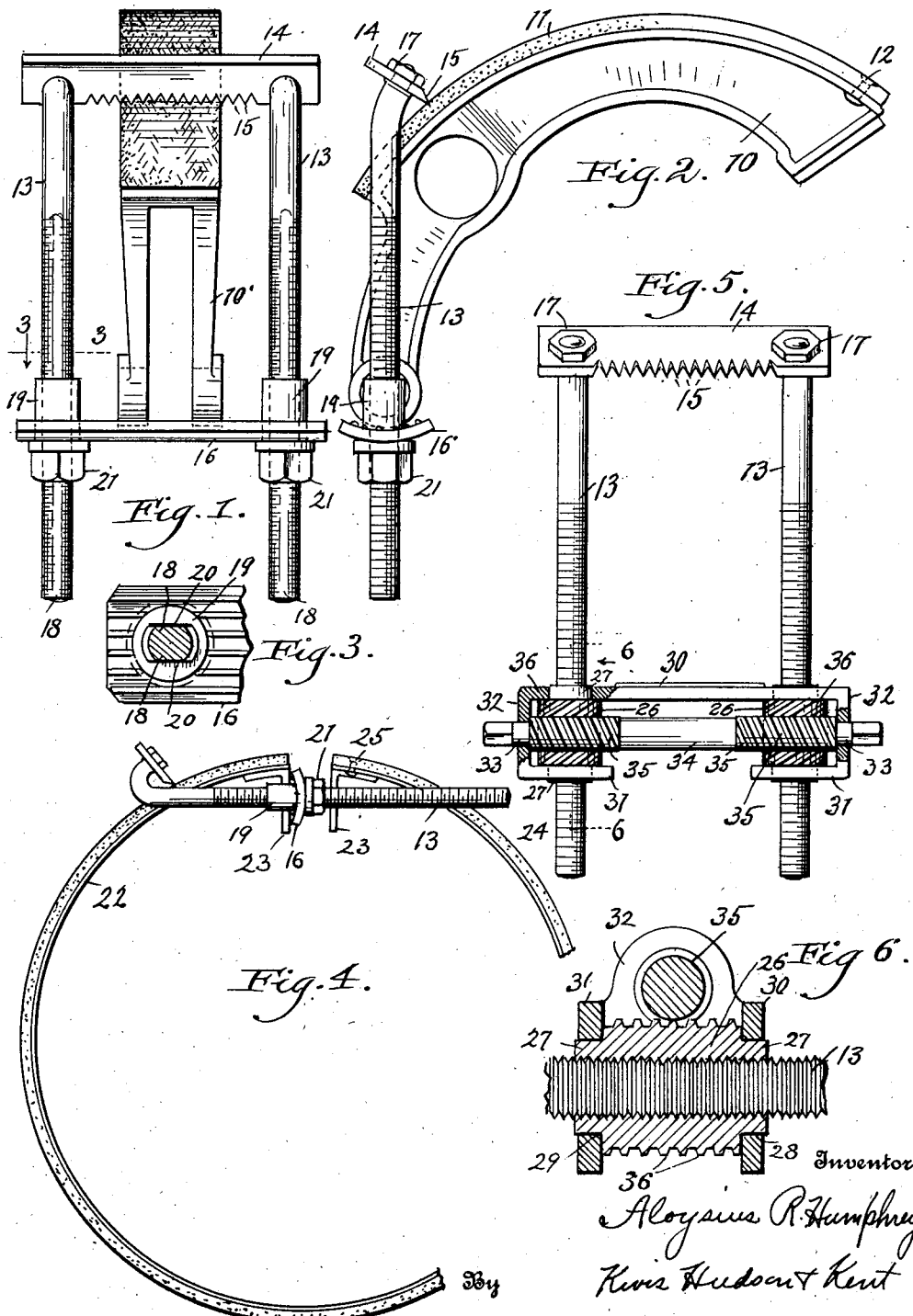

Patented June 5, 1928.

1,672,492

UNITED STATES PATENT OFFICE.

ALOYSIUS R. HUMPHREY, OF CLEVELAND, OHIO, ASSIGNOR OF ONE-THIRD TO LOUIS J. ALBRECHT, OF CLEVELAND, OHIO.

CLAMP FOR BRAKE LINING.

Application filed July 7, 1927. Serial No. 203,918.

This invention relates to improvements in devices for stretching and clamping brake lining while the lining is being applied to brake shoes.

The practice commonly followed in the application of lining to brake shoes of the internal, expanding type has been to rivet the lining to the shoe at one end and then to stretch the lining by hand and by the use of a chisel and hammer or some other pointed instrument and hammer. Obviously, such methods are very crude and cannot be expected to produce a tight fitting lining. Linings which are not tight have bulging portions between rivets that not only prevent even wear on the lining but also prevent the most efficient use of the brakes for the reason that the valleys in the lining are not permitted to come into contact with the brake drum. Nevertheless, these crude methods are generally adhered to because of the fact that such stretchers and clamps as have been proposed heretofore have been too cumbersome for certain types of brake shoes and have interfered with the use of riveting machines designed for the application of brake lining.

Accordingly, it is one of the objects of my invention to provide a device of this character which will grip the lining near its free end and yet not interfere with the operation of the punching machine and riveting machine in setting rivets at such free end.

Another object is the provision of a device of the character referred to which will be of universal application and particularly one which may be employed upon single piece shoes, the ends of which approach each other closely.

Other objects, and objects relating to details of construction and economies of manufacture, will appear as I proceed with the description of those embodiments of the invention which, for the purposes of the present application, I have illustrated in the accompanying drawing, in which:

Fig. 1 is a view in edge elevation of a brake shoe of the multiple piece type, with my stretcher and clamp applied thereto.

Fig. 2 is a side elevation of the structure shown in Fig. 1.

Fig. 3 is a fragmental sectional view taken substantially on the line 3—3 Fig. 1.

Fig. 4 is a view in side elevation of a shoe of the single piece type with my stretcher and clamp applied thereto.

Fig. 5 is an elevational view, partly in section, of a modified form of the device.

Fig. 6 is a sectional detail view taken on the line 6—6 Fig. 5.

Referring first to Figs. 1, 2 and 3, the brake shoe 10 here illustrated is one of a well known form in which three shoes are used to make up the complete circle. The brake lining is shown at 11 and one of the initially set rivets is indicated at 12. The device which forms the subject of the present invention is comprised of two parallel side posts 13 joined by a transverse end bar or cross-head 14 with teeth 15 for gripping the lining and by a traveling clamp bar 16 for engagement with some part of the shoe, in this case the ends of a bifurcated portion of the latter marked 10' in the drawing. It is, of course, not essential that the cross-head 14 be formed of a piece of metal separate from the side posts 13, but for manufacturing reasons it is most desirable to so construct it. As shown in Fig. 2, I produce a slight bend in each of the posts 13 near its upper end and reduce these ends to form shoulders against which the bar 14 bears. The reduced ends are threaded and nuts 17 are applied to hold the bar against these shoulders. The bar 14 is thus supported with its teeth 15 inclined at the angle which has been found best suited to the average case.

The posts 13 are spaced apart far enough to straddle the thickest brake shoe upon which the clamp is to be employed. These posts are threaded for a considerable distance from their free ends and are then flatted upon opposite sides, as shown at 18. The clamp bar 16 is preferably concaved somewhat on its upper face and provided with ribs or corrugations so that it may the more readily engage and cling to the various kinds of surfaces encountered. At its ends, this bar is provided with shoes 19 which may be either separate or integral with the bar proper, these shoes having flatted cylindrical openings therethrough, their flatted portions 20 engaging and sliding upon the flatted portions 18 of the posts. Hence wear upon the threads of the posts, due to the movement of the bar 16 thereon, is reduced to a minimum. The bar 16 may be moved toward the cross-head 14 by means of nuts 21 threaded upon the posts 13.

Fig. 4 illustrates the use of the same form of clamp in the application of lining to a single piece brake shoe, or one in which the parts of the shoe are not separable. In this figure, the shoe is designated 22. At its ends it is provided with angles 23 secured thereto by rivets or the like. The lining is indicated at 24 and is shown secured to one end of the shoe by a rivet 25. So far as I am aware, it has been impossible to apply the hitherto proposed clamps to brake shoes of this type because of the small amount of clearance between the angles 23 or other end portions of the shoe. My clamp, however, leaves the space between the side posts entirely free and unobstructed except for the clamping bar 16 and that is so narrow that it easily fits between the ends of the shoe or the angles 23 or similar parts.

For purposes of illustration, I have shown the gripping bar 14 fixed and the clamping bar 16 movable, but obviously the opposite arrangement would come within the purview of my invention.

The form of the invention illustrated in Figs. 5 and 6 is similar in most particulars to that previously described, but differs in this respect that the nuts on the posts 13 are moved simultaneously by a single operation. In Figs. 5 and 6, the nuts are shown at 26. They are provided with reduced ends 27 which fit in bearing holes 28 and 29 that are formed in a transverse clamping bar 30 and in angular extensions 31 thereof which are joined to the bar by end pieces 32. These end pieces are wider than the parts 30 and 31 and have bearings therein for the reduced end portions 33 of a shaft 34 which is provided with two sets of spiral teeth 35 meshing with spiral teeth 36 on the outside of nuts 26. One or both extremities of the shaft 34 are squared in order to receive a handle or tool by means of which the shaft may be turned. The central part of the bar 30 is preferably bowed somewhat to provide a concave upper surface like that of the bar 16. Although the clamp bar 30 and its extensions 31 might have bearing upon the posts 13 similar to the bearing of the bar 16 in the previously described form of the invention, I prefer to mount these parts upon the reduced ends 27 of the nuts 26. The provision of flats on the posts is, therefore, unnecessary in this form of the device.

In the use of either modification of the invention, brake lining cut to the proper length is placed upon the shoe and attached thereto at one end by means of rivets 12 or 25. The teeth 15 are then caused to grip the lining near its opposite end and the clamp is brought into position with its clamping bar 16 or 30, as the case may be, opposite the bifurcated end 10' of the brake shoe 10 or opposite the angle 23 of the brake shoe 22. Now in the case of the first modification described, the operator turns up the nuts 21 by the use of a spanner or other wrench, being careful to manipulate one nut approximately equally with the other so that the bar 16 will be maintained in substantially parallel relation with the cross-head 14. In the case of the second modification, the nuts 26 are turned simultaneously by the application of a crank handle or the like to one end of shaft 34. The lining is thus stretched upon the shoe and this stretching action is carried to an extent slightly greater than is required in the finished job. A pair of rivets are then set to hold the lining to the shoe at the end beyond where the clamp is applied. Then the clamp is removed and the tension in the lining distributes itself evenly along the length of the piece. Thereafter, the remaining rivets are set and the job is finished.

The clamp as illustrated in Fig. 4 contains a modification of the structure illustrated in Figs. 1 and 2 in the respect that the bends in the posts 13 are in a reverse direction, which is of some advantage because it throws the posts further away from the surface of the lining near the cross-head, and thereby provides greater clearance for the use of punching and riveting machines.

Having thus described my invention, I claim:

1. In a stretcher and clamp for applying lining to brakes, two parallel posts spaced apart a distance greater than the width of a brake shoe, a cross-head having means thereon for gripping a lining, said posts being joined at one end by said cross-head, a clamp bar mounted upon said posts and extending across the space therebetween, and means directly engaging both of said posts for adjusting said bar along said posts, the space between said posts being otherwise unencumbered.

2. In a stretcher and clamp for applying lining to brakes, a brake shoe straddling element of generally U-shaped form, lining gripping means upon the transverse portion of said straddling element, a clamp bar mounted upon the side bars or posts of said U-shaped element and extending across the space therebetween, and individual means having operative engagement with each of said posts for moving said bar along said straddling element.

3. In a stretcher and clamp for applying lining to brakes, two parallel posts spaced apart a distance greater than the width of a brake shoe, a cross-head having means thereon for gripping a lining, said posts being joined at one end by said cross-head, a clamp bar bridging the space between said posts, and nuts threadably engaging said posts and adapted to engage said bar to move it towards said cross-head.

4. In a stretcher and clamp for applying lining to brakes, two parallel posts spaced apart a distance greater than the width of a brake shoe, two transverse bars joining said posts, one of said transverse bars being fixed and one movable along said posts, one of said transverse bars being provided with means for gripping a lining and the other being provided with means for engaging a brake shoe, and a nut threadably mounted upon each of said posts and adapted to engage said movable transverse bar, whereby said transverse bars may be made to approach each other.

In testimony whereof, I hereunto affix my signature.

ALOYSIUS R. HUMPHREY.